(12) United States Patent
Saito et al.

(10) Patent No.: US 11,548,231 B2
(45) Date of Patent: *Jan. 10, 2023

(54) THREE-DIMENSIONAL MODELING APPARATUS AND METHOD FOR CONTROLLING THREE-DIMENSIONAL MODELING APPARATUS

(71) Applicant: Seiko Epson Corporation, Toyko (JP)

(72) Inventors: Koichi Saito, Matsumoto (JP); Kohei Yuwaki, Shiojiri (JP); Kazuhide Nakamura, Asahi (JP); Shunsuke Mizukami, Hokuto (JP)

(73) Assignee: SEIKO EPSON CORPORATION

( * ) Notice: Subject to any disclaimer, the term of this patent is extended or adjusted under 35 U.S.C. 154(b) by 15 days.

This patent is subject to a terminal disclaimer.

(21) Appl. No.: 17/124,944

(22) Filed: Dec. 17, 2020

(65) Prior Publication Data
US 2021/0101345 A1    Apr. 8, 2021

Related U.S. Application Data

(63) Continuation of application No. 16/048,922, filed on Jul. 30, 2018, now Pat. No. 10,946,587.

(30) Foreign Application Priority Data

Jul. 31, 2017    (JP) .............................. JP2017-147613

(51) Int. Cl.
*B29C 64/393*    (2017.01)
*B29C 64/106*    (2017.01)
(Continued)

(52) U.S. Cl.
CPC .......... *B29C 64/393* (2017.08); *B29C 64/106* (2017.08); *B29C 64/209* (2017.08);
(Continued)

(58) Field of Classification Search
CPC .................................................... B29C 45/27
See application file for complete search history.

(56) References Cited

U.S. PATENT DOCUMENTS 10,946,587 B2 *   3/2021   Saito ..................... B33Y 10/00
2008/0213419 A1   9/2008   Skubic et al.
(Continued)

FOREIGN PATENT DOCUMENTS

CN    204 622 625 U    9/2015
CN    105479694 A      4/2016
(Continued)

OTHER PUBLICATIONS

Extended European Search Report for Application No. EP 18 18 6316 dated Nov. 26, 2018 (8 pages).

*Primary Examiner* — Kelly M Gambetta
*Assistant Examiner* — Virak Nguon
(74) *Attorney, Agent, or Firm* — Harness, Dickey & Pierce, P.L.C.

(57) ABSTRACT

A three-dimensional modeling apparatus includes a nozzle that ejects a molten material, which is a plasticized thermoplastic material, a plasticization section which includes a flat screw having a groove extending in a volute shape and a driving motor that rotates the flat screw, the plasticization section rotating the flat screw to thereby guide the molten material to the nozzle through the groove, and an ejection control mechanism that is disposed in a flow path between the flat screw and the nozzle, and controls an outflow of the molten material from the nozzle.

11 Claims, 9 Drawing Sheets

(51) Int. Cl.
*B33Y 50/02* (2015.01)
*B33Y 10/00* (2015.01)
*B33Y 30/00* (2015.01)
*B29C 64/209* (2017.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2016/0046073 A1* | 2/2016 | Hadas | B29C 48/301 425/382.2 |
| 2017/0182701 A1 | 6/2017 | Ryan et al. | |
| 2017/0210069 A1* | 7/2017 | Stubenruss | B29C 48/02 |
| 2018/0354194 A1 | 12/2018 | Huang | |

FOREIGN PATENT DOCUMENTS

| | | |
|---|---|---|
| CN | 205871191 U | 1/2017 |
| CN | 106573405 A | 4/2017 |
| EP | 1 123 750 A1 | 8/2001 |
| JP | 2017-035811 A | 2/2017 |

* cited by examiner

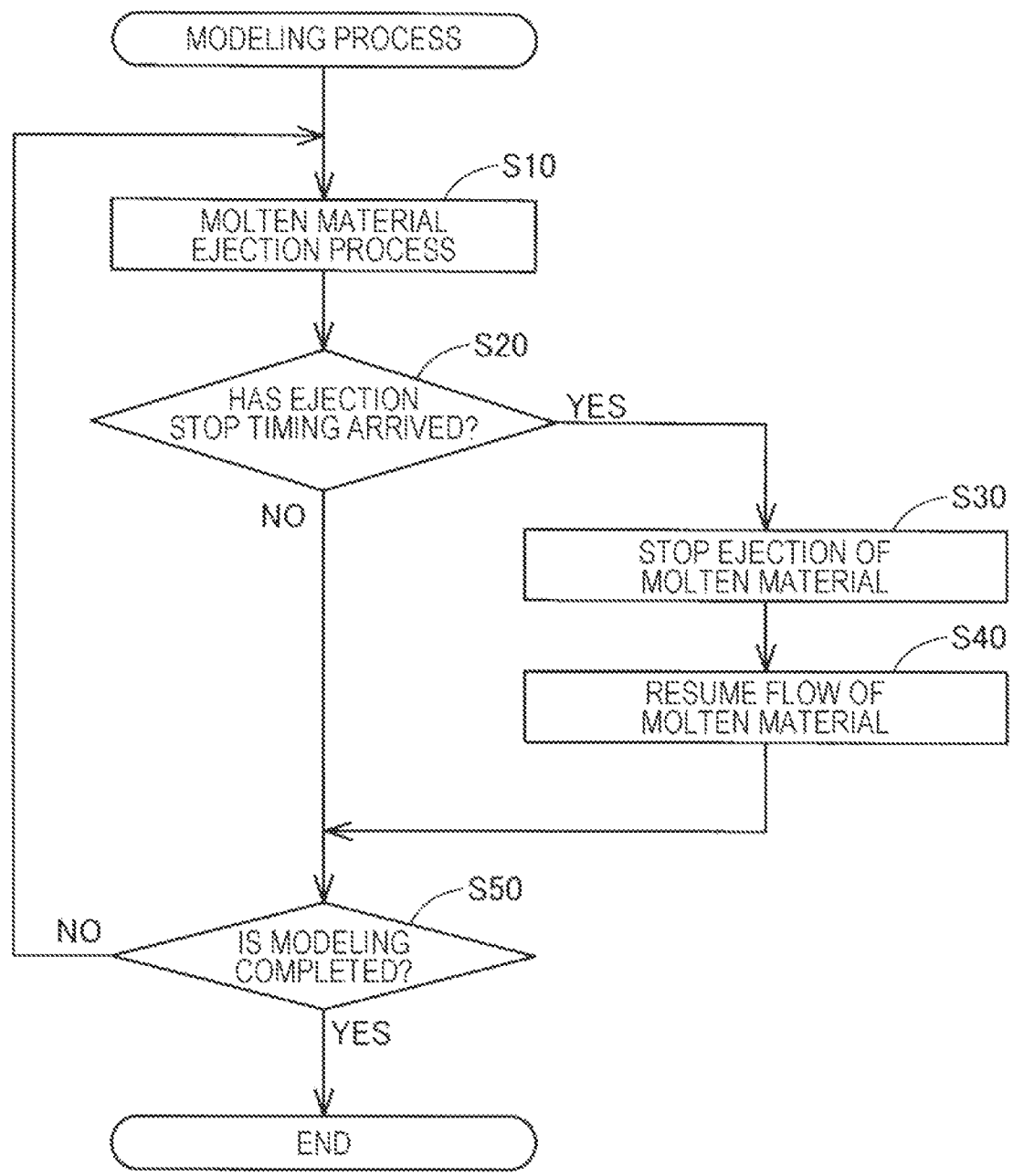

THREE-DIMENSIONAL MODELING APPARATUS AND METHOD FOR CONTROLLING THREE-DIMENSIONAL MODELING APPARATUS

This application is a continuation application of U.S. patent application Ser. No. 16/048,922 filed Jul. 30, 2018, which claims priority under 35 U.S.C. § 119 to Japanese Patent Application No. 2017-147613 filed on Jul. 31, 2017, the entire disclosure of which is expressly incorporated by reference herein.

BACKGROUND

1. Technical Field

The present invention relates to three-dimensional modeling apparatuses and methods for controlling three-dimensional modeling apparatuses.

2. Related Art

There are three-dimensional modeling apparatuses known in the art, which eject a molten resin material from a nozzle, deposit and solidify the ejected resin material to produce a three-dimensional object. JP-A-2017-35811 is an example of related art.

Typically, such a three-dimensional modeling apparatus repeats start and stop of ejection of a molten material from a nozzle in modeling process. However, in turning off of the ejection of material from a nozzle, an outflow of the material from the nozzle cannot stop immediately, which may cause delay in stop timing of ejection of the material and cause the material to be ejected in excess of the expected amount. Further, in resuming of the ejection of material from a nozzle, material supply to the nozzle is delayed, which may cause delay in ejection timing of the material and cause shortage of ejection amount of the material. Thus, improvement in ejection timing of material from a nozzle and precision of the ejection amount is still required in three-dimensional modeling apparatuses.

SUMMARY

An advantage of some aspects of the invention can be implemented as follows.

[1] According to an aspect of the present invention, a three-dimensional modeling apparatus that produces a three-dimensional object is provided. The three-dimensional modeling apparatus includes: a nozzle that ejects a molten material; a plasticization section which includes a flat screw having a groove extending in a volute shape and a driving motor that rotates the flat screw, the plasticization section rotating the flat screw to thereby guide the molten material, which is a plasticized thermoplastic material, to the nozzle through the groove; and an ejection control mechanism that is disposed in a flow path between the flat screw and the nozzle, and controls an outflow of the molten material from the nozzle. In this three-dimensional modeling apparatus, an outflow of the molten material from the nozzle is controlled by the ejection control mechanism that is disposed between the flat screw and the nozzle. Accordingly, the start timing and stop timing of ejection of the molten material from the nozzle and the ejection amount of molten material can be controlled with high precision.

[2] In the three-dimensional modeling apparatus of the above aspect, the ejection control mechanism may include an open/close mechanism that opens and closes the flow path by means of a shutter. According to this three-dimensional modeling apparatus, since the flow path is opened and closed by the shutter, start and stop of ejection of the molten material from the nozzle can be performed at an appropriate timing. Moreover, since the flow path is opened and closed by the shutter, it is possible to reduce leakage of the molten material from the nozzle while ejection of the molten material from the nozzle is stopped.

[3] In the three-dimensional modeling apparatus of the above aspect, the ejection control mechanism may include a pressure changing section that suctions the molten material into a branched flow path connected to the flow path to thereby generate a negative pressure in the flow path. According to this three-dimensional modeling apparatus, since a negative pressure is generated in the flow path between the flat screw and the nozzle, ejection of the molten material from the nozzle can be immediately stopped. Further, when the ejection control mechanism is configured to have both the shutter and the pressure changing section, control properties of ejection of the molten material from the nozzle can be further improved.

[4] In the three-dimensional modeling apparatus according to the above aspect, the shutter of the open/close mechanism may be disposed upstream relative to the branched flow path of the pressure changing section. According to this three-dimensional modeling apparatus, the pressure changing section can prevent the molten material left on the downstream side of the shutter from flowing out from the nozzle after the flow path is closed by the shutter.

[5] In the three-dimensional modeling apparatus of the above aspect, the branched flow path of the pressure changing section may be disposed upstream relative to the shutter of the open/close mechanism. According to this three-dimensional modeling apparatus, an increase in pressure in the flow path between the flat screw and the shutter when the flow path is closed by the shutter can be reduced by generating a negative pressure in the pressure changing section.

[6] In the three-dimensional modeling apparatus of the above aspect, the pressure changing section may allow the molten material which has been suctioned into the branched flow path to be returned to the flow path to thereby increase pressure in the flow path. According to this three-dimensional modeling apparatus, since the pressure changing section allows the molten material to flow from the branched flow path to the flow path, pressure in the flow path can be immediately increased. Accordingly, ejection of the molten material from the nozzle can be immediately started.

[7] According to another aspect of the present invention, a method for controlling a three-dimensional modeling apparatus that produces a three-dimensional object is provided. This controlling method includes: an ejection step for rotating a flat screw having a groove extending in a volute shape by means of a driving motor to thereby guide a molten material, which is a plasticized thermoplastic material, to a nozzle through the groove and allow the molten material to be ejected from the nozzle; and an outflow control step for driving an ejection control mechanism that is disposed in a flow path for the molten material between the flat screw and the nozzle to thereby control an outflow of the molten material from the nozzle. According to this controlling method, since an outflow of the molten material from the nozzle can be controlled between the flat screw and the nozzle, the start timing and stop timing of ejection of molten material from the nozzle and the ejection amount of molten material can be controlled with high precision.

[8] In the controlling method of the above aspect, the ejection control mechanism includes an open/close mechanism that opens and closes the flow path by means of a shutter, and a pressure changing section that suctions the molten material into a branched flow path connected to the flow path to thereby generate a negative pressure in the flow path, and the outflow control step includes an ejection stop step for stopping an outflow of the molten material from the nozzle by driving one of the open/close mechanism and the pressure changing section of the ejection control mechanism, which is located on an upstream side, and then driving the other, which is located on a downstream side, while the molten material is ejected from the nozzle. According to this controlling method, when the shutter of the open/close mechanism is provided upstream relative to the branched flow path of the pressure changing section, a negative pressure can be generated on the downstream side of the shutter by the pressure changing section after the flow path is closed by the shutter. Accordingly, leakage of the molten material from the nozzle after the shutter is closed can be reduced. When the branched flow path of the pressure changing section is provided upstream relative to the shutter of the open/close mechanism, the shutter can be closed after the molten material flows into the branched flow path. Accordingly, leakage of the molten material from the nozzle caused by driving of the shutter can be reduced.

A plurality of elements of the aspects of the present invention described above are not necessarily essential. In order to solve part or all of the above problems, or to achieve part or all of the effects described herein, part of the plurality of elements can be altered, eliminated, or replaced with other new elements, or the limitations on the plurality of elements can be partially deleted as appropriate. Further, in order to solve part or all of the above problems, or to achieve part or all of the effects described herein, part or all of the technical features included in an aspect of the present invention can be combined with part or all of the technical features included in another aspect of the present invention to thereby provide an independent aspect of the present invention.

The present invention can be implemented in various forms other than a three-dimensional modeling apparatus and a method for controlling the same. For example, the present invention can be implemented as an ejection unit that ejects a molten material, a method for ejecting a molten material, and a method for producing a three-dimensional object using a molten material. In addition, the present invention can also be implemented as a method for controlling a three-dimensional modeling apparatus, a computer program for implementing various methods described above, and a non-transitory recording medium in which the computer program is recorded.

BRIEF DESCRIPTION OF THE DRAWINGS

The invention will be described with reference to the accompanying drawings, wherein like numbers reference like elements.

FIG. 6 is an explanatory view which illustrated an example of a flow of a modeling process according to the first embodiment.

DESCRIPTION OF EXEMPLARY EMBODIMENTS

1. First Embodiment

Figure 1:
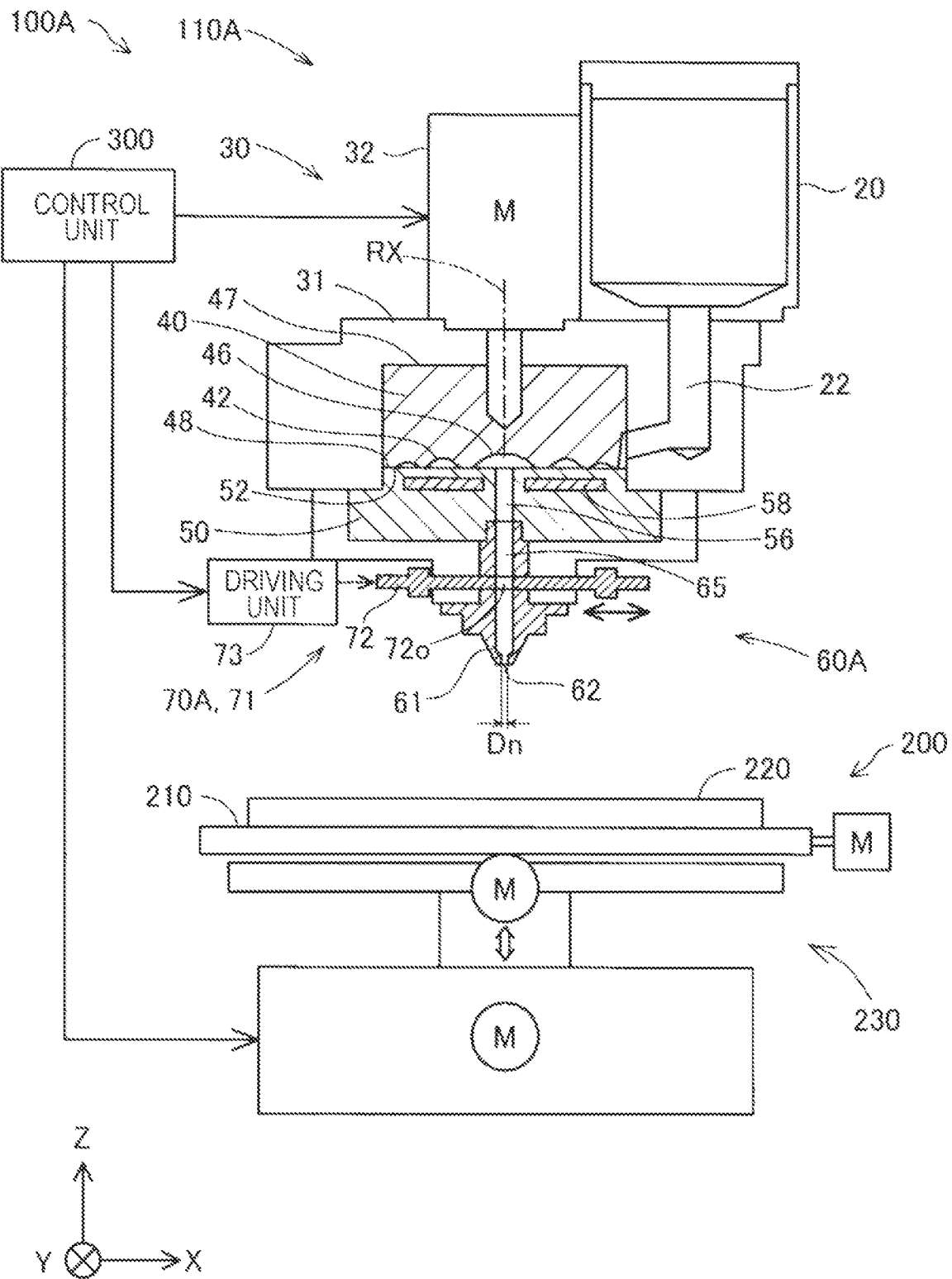
FIG. 1 is a schematic view which illustrates a configuration of a three-dimensional modeling apparatus of a first embodiment.

FIG. 1 is a schematic view of a configuration of a three-dimensional modeling apparatus 100A of a first embodiment. In FIG. 1, three directions X, Y, and Z perpendicular to each other are indicated by the arrows. The X direction and the Y direction are directions parallel with the horizontal plane, and the Z direction is a direction opposite to the gravitational direction (vertical direction). In other drawings, the arrows which indicate X, Y, and Z directions are also illustrated as necessary corresponding to FIG. 1.

The three-dimensional modeling apparatus 100A includes an ejection unit 110A, a modeling stage section 200, and a control unit 300. The three-dimensional modeling apparatus 100A is configured to eject a molten material, which is a plasticized thermoplastic material, from a nozzle 61 of the ejection unit 110A onto a modeling stage 220 of a modeling stage section 200 under control of a control unit 300, and solidify the ejected material to produce a three-dimensional object. The term "plasticization" means that a material is heated and melt.

The ejection unit 110A includes a material supply section 20, a plasticization section 30, and a head section 60A. The material supply section 20 is formed of a hopper, and a discharge port at the bottom is connected to the plasticization section 30 via a communication path 22. The material supply section 20 supplies a thermoplastic material to the plasticization section 30.

Examples of the material fed into the material supply section 20 include polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), poly ether ether ketone (PEEK), and polycarbonate (PC). These materials are fed into the material supply section 20 in a state of solid material such as pellets and powder. Further, pigments, metals, ceramics, and the like may be added to thermoplastic materials fed into the material supply section 20.

The plasticization section 30 plasticizes the above material and make the plasticized material flow into the head section 60A. The plasticization section 30 includes a screw case 31, a driving motor 32, a flat screw 40, and a screw facing section 50.

The flat screw 40 is a substantially cylindrically shaped screw having a height in the vertical direction (direction in the center axis) smaller than the diameter. Grooves 42 are formed on an undersurface 48 that is perpendicular to a rotation axis RX. The aforementioned communication path 22 of the material supply section 20 is connected between the side surface of the flat screw 40 and the grooves 42. The specific shape of the flat screw 40 will be described.

The flat screw 40 is positioned with the vertical direction parallel with the Z direction, and rotates in a circumferential direction. In FIG. 1, the rotation axis RX of the flat screw 40 is indicated by the dot and dashed line. In the first embodiment, the center axis of the flat screw 40 corresponds to the rotation axis RX.

The flat screw 40 is housed in the screw case 31. The flat screw 40 is connected to the driving motor 32 at a top 47 and rotates in the screw case 31 by driving force from the driving motor 32. The driving motor 32 drives under control of the control unit 300.

The undersurface 48 of the flat screw 40 faces a top 52 of the screw facing section 50 so that a space is formed between the grooves 42 on the undersurface 48 of the flat screw 40 and the top 52 of the screw facing section 50. In the ejection unit 110A, a material fed from the material supply section 20 is supplied into the space between the flat screw 40 and the screw facing section 50.

A heater 58 for heating the material is incorporated in the screw facing section 50. The material supplied in the grooves 42 of the flat screw 40 is plasticized and converted into a molten material by rotation of the flat screw 40, while flowing along the grooves 42 and being guided toward a center section 46 of the flat screw 40 (details are described later). A molten material flowed in the center section 46 is supplied to the head section 60A via a communication hole 56 formed at the center of the screw facing section 50.

The head section 60A includes the nozzle 61, a flow path 65, and an ejection control mechanism 70A. The nozzle 61 ejects a molten material from an ejection port 62 at the tip. The ejection port 62 of the nozzle 61 has a hole diameter Dn. The nozzle 61 is connected to the communication hole 56 of the screw facing section 50 via the flow path 65. The flow path 65 is a flow path for a molten material between the flat screw 40 and the nozzle 61. A molten material plasticized in the plasticization section 30 flows from the communication hole 56 into the flow path 65, and is ejected from the ejection port 62 of the nozzle 61 onto the modeling stage 220 of the modeling stage section 200.

Further, a molten material is ejected from the nozzle 61, when heated to a glass transition temperature or more and fully melt. For example, an ABS resin has a glass transition temperature of approximately 120° C., and reaches approximately 200° C. when ejected from the nozzle 61. Accordingly, a heater may be disposed around the nozzle 61 to eject a molten material at such a high temperature.

The ejection control mechanism 70A is disposed in the flow path 65 to control an outflow of a molten material from the nozzle 61. In the first embodiment, the ejection control mechanism 70A includes an open/close mechanism 71 that opens/closes the flow path 65. The open/close mechanism 71 includes a shutter 72 and a shutter driving unit 73. The shutter 72 is formed of a plate member, and the plate surface of the shutter 72 is oriented perpendicular to the flow path 65. The shutter 72 includes a through hole 72o which extends penetrating in the thickness direction of the shutter 72 and can be connected to the flow path 65.

The shutter driving unit 73 moves the shutter 72 in a direction perpendicular to the flow path 65. The shutter driving unit 73 moves the shutter 72 and thus the position of the through hole 72o relative to the flow path 65 under control by the control unit 300 to thereby open and close the flow path 65. The shutter driving unit 73 can be formed of, for example, a piezo element that deforms by expansion and contraction to thereby displace the shutter 72. The shutter driving unit 73 is not limited to the piezo element, and may be formed of an actuator such as a solenoid, an air cylinder, or a motor. An open/close operation of the flow path 65 by the shutter 72 will be described later.

The modeling stage section 200 includes a table 210, a modeling stage 220 disposed on the table 210, and a movement mechanism 230 that moves the modeling stage 220. The movement mechanism 230 is composed of a three-axis positioner that moves the modeling stage 220 in three-axis directions of X, Y, and Z directions by a driving force of three motors. The modeling stage section 200 changes the relative positional relationship between the nozzle 61 and the modeling stage 220 under control of the control unit 300.

The control unit 300 can be implemented by, for example, a computer including a processor such as a CPU, a main memory, and a non-volatile memory. The non-volatile memory in the control unit 300 stores a computer program for controlling the three-dimensional modeling apparatus 100A. The control unit 300 performs modeling process by driving the ejection unit 110A and the ejection control mechanism 70A to eject a molten material onto the modeling stage 220 at a coordinate position in accordance with the modeling data, and solidifying the ejected material to produce a three-dimensional object three-dimensional object.

Figure 2:
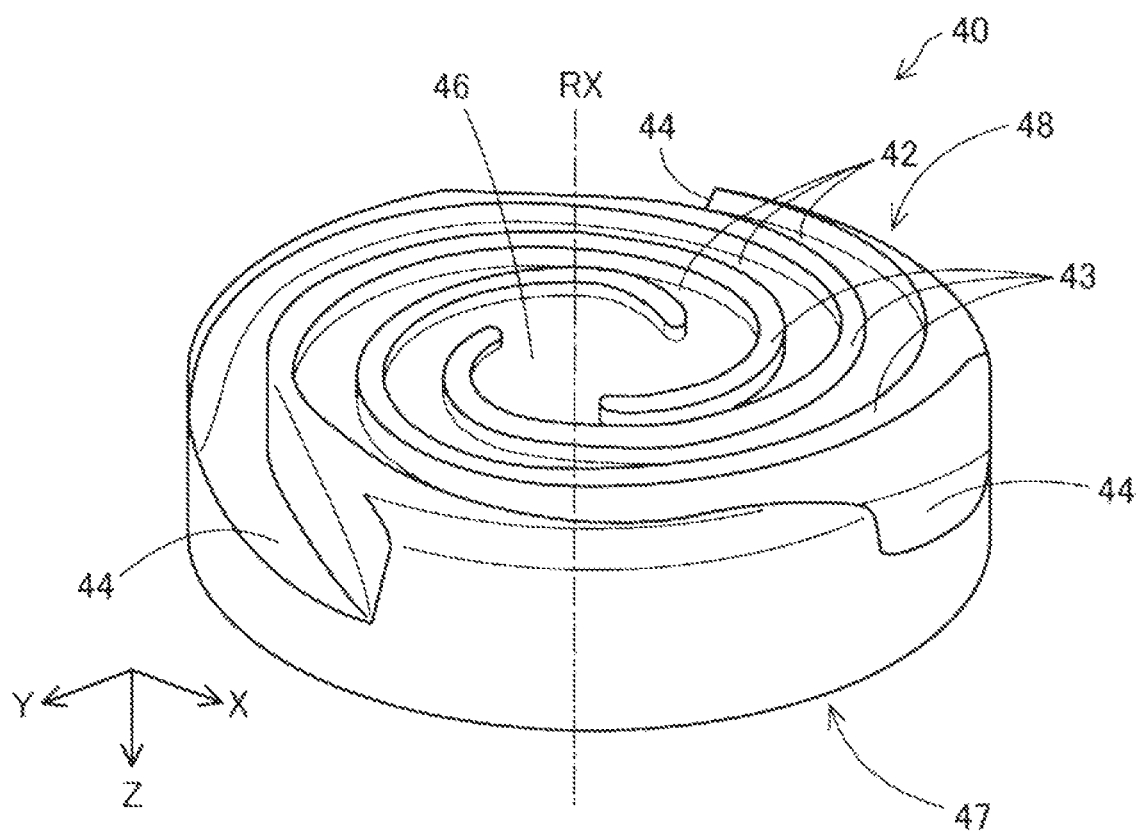
FIG. 2 is a schematic perspective view of a flat screw.

FIG. 2 is a schematic perspective view which illustrates a configuration of the undersurface 48 of the flat screw 40. In FIG. 2, the position of the rotation axis RX of the flat screw 40 rotating in the plasticization section 30 is indicated by the dot and dashed line. As described above, the grooves 42 are disposed on the undersurface 48 of the flat screw 40 which faces the screw facing section 50 (FIG. 1). Hereinafter, the undersurface 48 is referred to as a "groove forming surface 48".

The center section 46 of the groove forming surface 48 of the flat screw 40 is configured as a recess to which one end of each groove 42 is connected. The center section faces the communication hole 56 (FIG. 1) of the screw facing section 50. In the first embodiment, the center section 46 intersects with the rotation axis RX.

The grooves 42 of the flat screw 40 form so-called scroll grooves. The grooves 42 extend from the center section 46 to the outer periphery of the flat screw 40 in a volute shape with curved lines. The grooves 42 may also be formed as a spiral shape. FIG. 2 illustrates an example of the flat screw 40 which includes three ridges 43 that constitute side walls of three grooves 42 and extend along the respective grooves 42. The number of the grooves 42 and the ridges 43 provided on the flat screw 40 is not limited to three. The flat screw 40 may have only one groove 42, or two or more grooves 42. Further, any number of ridges 43 may be provided corresponding to the number of grooves 42.

The grooves 42 continue to a material inlet 44 formed on the side surface of the flat screw 40. The material inlet 44 is a portion that receives a material supplied through the communication path 22 of the material supply section 20. Further, FIG. 2 illustrates an example of the flat screw 40 having the material inlet ports 44 disposed at three positions. The number of the material inlet ports 44 provided on the flat screw 40 is not limited to three. The material inlet port 44 may be disposed at only one position, or two or more positions on the flat screw 40.

As the flat screw 40 rotates, a material supplied from the material inlet port 44 is plasticized and melt in the grooves 42 while being heated, and converted into a molten material. Then, the molten material flows to the center section 46 through the grooves 42.

Figure 3:
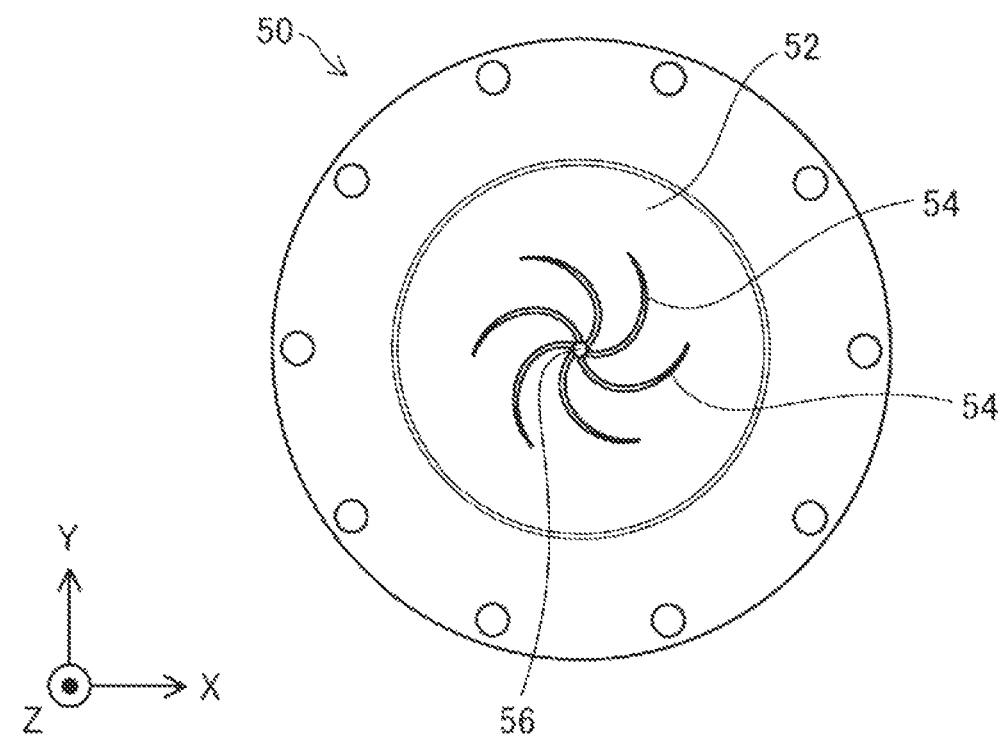
FIG. 3 is a schematic plan view of a screw facing section.

FIG. 3 is a schematic plan view which illustrates the top 52 of the screw facing section 50. As described above, the top 52 of the screw facing section 50 faces the groove forming surface 48 of the flat screw 40. Hereinafter, the top 52 is referred to as a "screw facing surface 52". The communication hole 56 described above is formed at the center of the screw facing surface 52 so as to supply a molten material therethrough to the nozzle 61.

The screw facing surface 52 has a plurality of guide grooves 54 that are connected to the communication hole 56 and extend from the communication hole 56 to the outer periphery in a volute shape with curved lines. The plurality of guide grooves 54 has a function of guiding a molten material to the communication hole 56. As described above, the heater 58 for heating the material is incorporated in the screw facing section 50 (FIG. 1). The material is plasticized in the plasticization section 30 by heating of the heater 58 and rotation of the flat screw 40.

Figure 4:
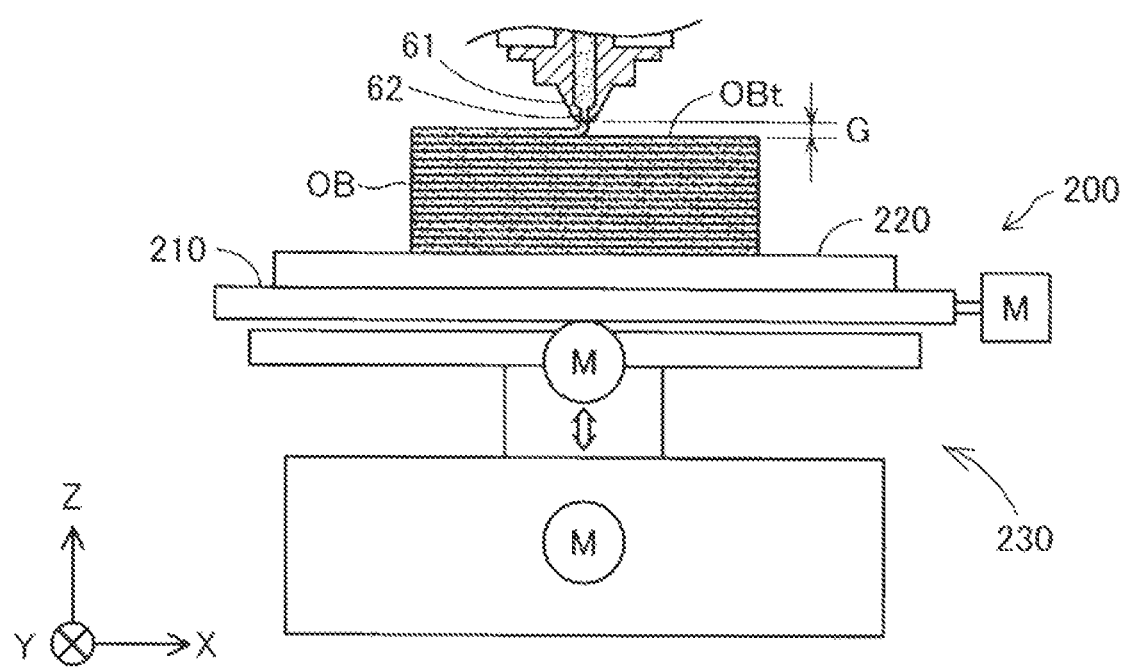
FIG. 4 is an explanatory view which illustrates a positional relationship between a three-dimensional object and a tip of a nozzle.

FIG. 4 is an explanatory view which illustrates a positional relationship between a three-dimensional object OB and the ejection port 62 at the tip of the nozzle 61. FIG. 4 schematically illustrates that the three-dimensional object OB is being produced on the modeling stage 220.

In the three-dimensional modeling apparatus 100A, a gap G is formed between the ejection port 62 at the tip of the nozzle 61 and a top OBt of the three-dimensional object OB which is being produced. The term "top OBt of the three-dimensional object OB" as used herein refers to an expected position where a molten material ejected from the nozzle 61 is deposited near immediately under the nozzle 61.

The size of the gap G is preferably not less than the hole diameter Dn (FIG. 1) at the ejection port 62 of the nozzle 61, and is preferably 1.1 times or more of the hole diameter Dn. Accordingly, a molten material ejected from the ejection port 62 of the nozzle 61 is deposited on the top OBt of the three-dimensional object OB without being tightly pressed against the top OBt of the three-dimensional object OB which is being produced. As a result, the horizontal cross-sectional shape of the molten material ejected from the nozzle 61 is prevented from being collapsed, thereby reducing surface-roughness of the three-dimensional object OB. Further, in the configuration in which a heater is provided around the nozzle 61, the gap G can prevent superheating of a material by the heater, thereby reducing discoloration or degradation by superheating of the material deposited on the three-dimensional object OB.

Moreover, the size of the gap G is preferably not more than 1.5 times of the hole diameter Dn, and more specifically not more than 1.3 times of the hole diameter Dn. This prevents reduction in precision for an expected position where a molten material is deposited and reduction in adhesiveness of a molten material to the top OBt of the three-dimensional object OB which is being produced.

Figure 5A:
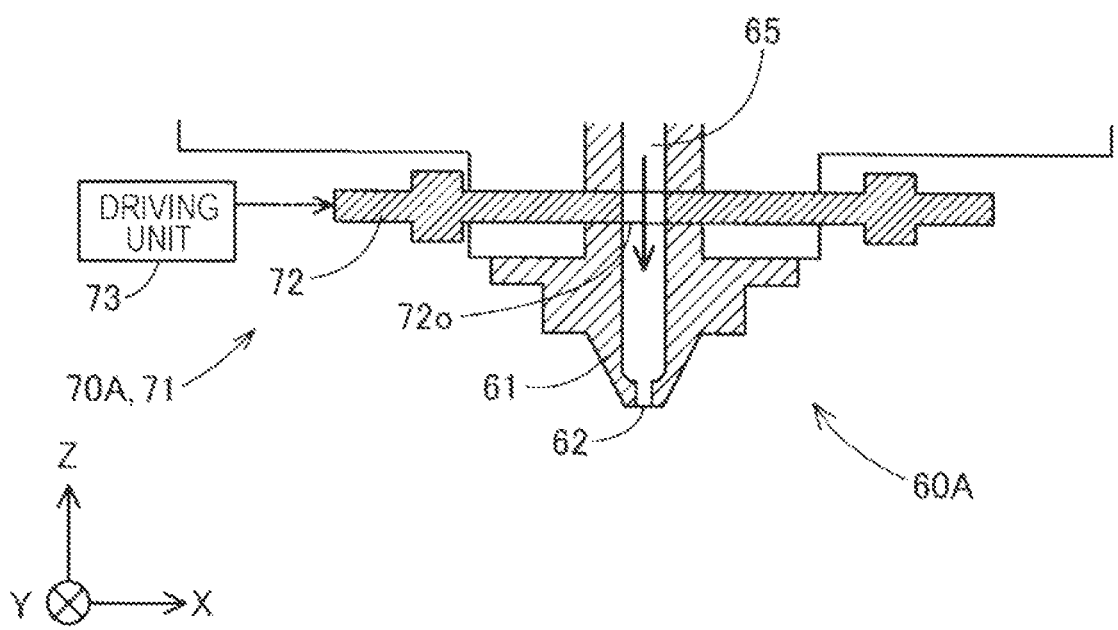
FIG. 5A is a first schematic view which illustrates an open/close operation of a flow path by an open/close mechanism.
Figure 5B:
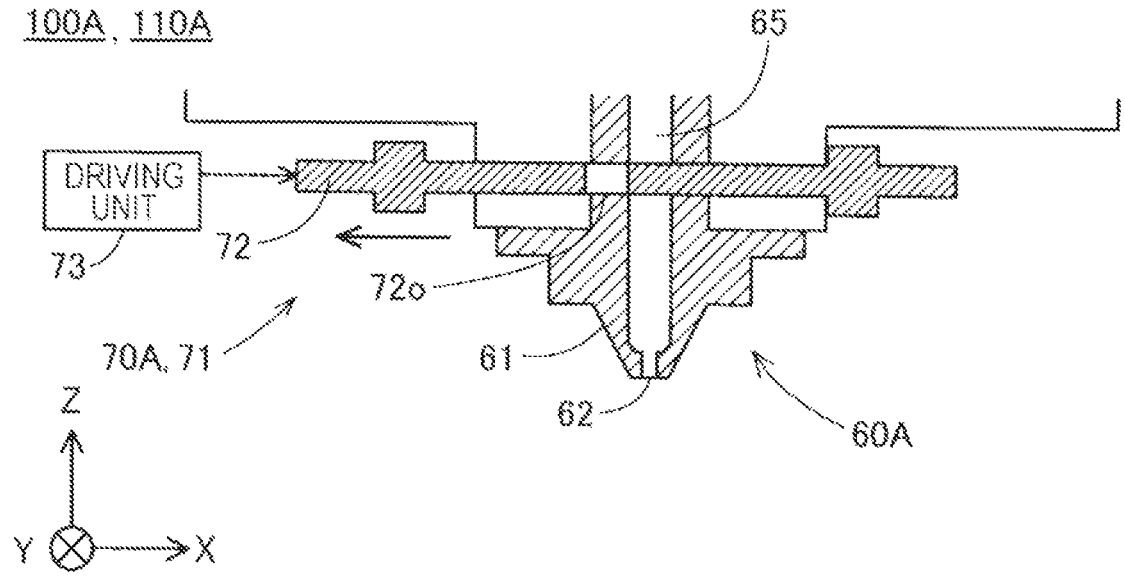
FIG. 5B is a second schematic view which illustrates an open/close operation of a flow path by an open/close mechanism.

Referring to FIGS. 5A and 5B, an open/close operation of the flow path 65 by the open/close mechanism 71 of the ejection control mechanism 70A will be described. FIG. 5A illustrates that the shutter 72 of the open/close mechanism 71 is positioned to open the flow path 65. In the state where the flow path 65 is opened by the shutter 72, the shutter 72 is located at a position where the through hole 72o is aligned with an opening region of the flow path 65. Accordingly, a molten material is allowed to flow into the nozzle 61 through the through hole 72o and flow out from the ejection port 62 of the nozzle 61.

FIG. 5B illustrates that the shutter 72 is positioned to close the flow path 65. In the state where the flow path 65 is closed by the shutter 72, the shutter 72 is located at a position where the through hole 72o is deviated from an opening region of the flow path 65. Accordingly, an inflow of molten material from the flow path 65 to the nozzle 61 is blocked by the shutter 72 so that a molten material does not flow out from the ejection port 62 of the nozzle 61.

In the three-dimensional modeling apparatus 100A, the size of the ejection unit 110A in the Z direction is reduced by use of the flat screw 40. Further, a surface roughness of the three-dimensional object OB is reduced by defining the gap G between the tip of the nozzle 61 and the three-dimensional object OB to be a small range as described above. In addition, the positioning precision of material is improved, and the adhesiveness between materials in the three-dimensional object OB is prevented from decreasing.

Moreover, since the ejection control mechanism 70A is provided in the flow path 65 between the flat screw 40 and the nozzle 61, an outflow of molten material is controlled at a position close to the ejection port 62 of the nozzle 61. Accordingly, a delay in response to the start/stop of an outflow of molten material from the ejection port 62 of the nozzle 61 to the open/close timing of the flow path 65 by the ejection control mechanism 70A is controlled. Therefore, the start timing and stop timing of ejection of a molten material from the nozzle 61 and the ejection amount of molten material can be controlled with high precision.

According to the three-dimensional modeling apparatus 100A, since the flow path 65 is closed by the shutter 72 of the open/close mechanism 71, it is possible to prevent leakage of a molten material from the nozzle 61 while an outflow of molten material from the nozzle 61 is stopped. Further, according to the three-dimensional modeling apparatus 100A, since the flow path 65 is shut off by the shutter 72, it is possible to stop ejection of a molten material from the nozzle 61 while the flat screw 40 continues to rotate by the driving motor 32.

FIG. 6 is an explanatory view which illustrates an example of a flow of modeling process performed by the control unit 300. Step S10 is an ejection step in which a molten material is ejected from the nozzle 61. In step S10, the control unit 300 drives the driving motor 32 of the plasticization section 30 to rotate the flat screw 40 to thereby perform ejection process by which a molten material is continuously ejected from the nozzle 61 onto the modeling stage 220. During ejection process, the control unit 300 controls the movement mechanism 230 of the modeling stage section 200 to displace the modeling stage 220 in accordance with the modeling data. Accordingly, a molten material is deposited on the modeling stage 220 at a target position.

In the middle of the ejection process of step S10, the control unit 300 determines whether a timing to temporarily stop ejection of a molten material has arrived or not (step S20). The control unit 300 may perform this determination on the basis of the modeling data. For example, the control unit 300 determines that the timing to temporarily stop ejection of a molten material from the nozzle 61 has arrived when deposition of a molten material is performed at a position separated by a predetermined distance from a position where it has been ejected. Alternatively, the control unit 300 may determine that the timing to temporarily stop ejection of a molten material from the nozzle 61 has arrived when it receives an interrupt command for temporary stop from a user or a high level control unit.

If the timing to discontinue ejection of a molten material has not arrived and the modeling process has not yet finished, the control unit 300 continues the ejection process of a molten material of step S10 (step S50). On the other hand, if the timing to discontinue ejection of a molten material has arrived, the control unit 300 performs processing of steps S30 and S40.

Steps S30 and S40 are outflow control steps in which an outflow of a molten material from the nozzle 61 is controlled. The control unit 300 controls the ejection control mechanism 70A to close the flow path 65 by the shutter 72 to thereby stop an outflow of a molten material from the nozzle 61 (step S30). During suspension of an outflow of a molten material from the nozzle 61, the control unit 300 may change the position of the nozzle 61 relative to the modeling stage 220, for example, to a coordinate position on the modeling stage 220 at which ejection of a molten material is resumed.

Then, when the timing to resume ejection of a molten material from the nozzle 61 has arrived, the control unit 300 moves the shutter 72 to open the flow path 65 to thereby allow the molten material to flow out from the nozzle 61 (step S40), and return to the ejection process of step S10 (step S50). In step S30, when the flow path 65 is closed by the shutter 72 to thereby temporarily stop ejection of the molten material from the nozzle 61, the control unit 300 preferably does not stop rotation of the flat screw 40 and allows it to continue. Accordingly, in step S40, ejection of the molten material from the nozzle 61 can be immediately resumed.

As described above, according to the three-dimensional modeling apparatus 100A of the first embodiment, downsizing of the apparatus and improvement in modeling precision can be achieved by use of the flat screw 40. Moreover, the open/close mechanism 71, which is disposed as an ejection control mechanism 70A in the flow path 65 between the flat screw 40 and the nozzle 61, can improve precision in ejection timing and ejection amount of a molten material from the nozzle 61. In addition, according to the three-dimensional modeling apparatus 100A of the first embodiment, various effects described in the first embodiment can be achieved.

2. Second Embodiment

Figure 7A:
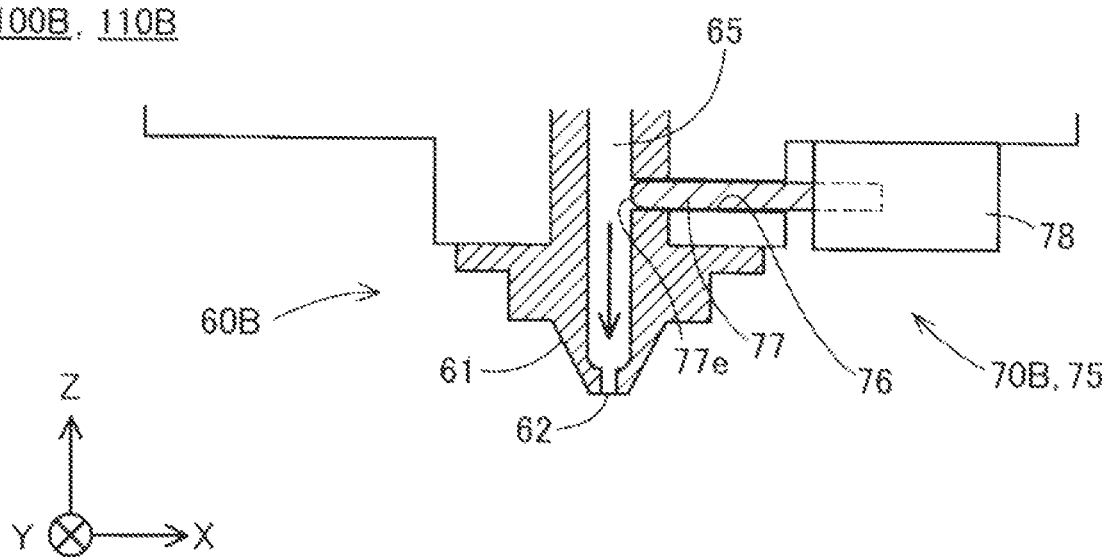
FIG. 7A is a first schematic view which illustrates a configuration of a pressure changing section of a three-dimensional modeling apparatus according to a second embodiment.
Figure 7B:
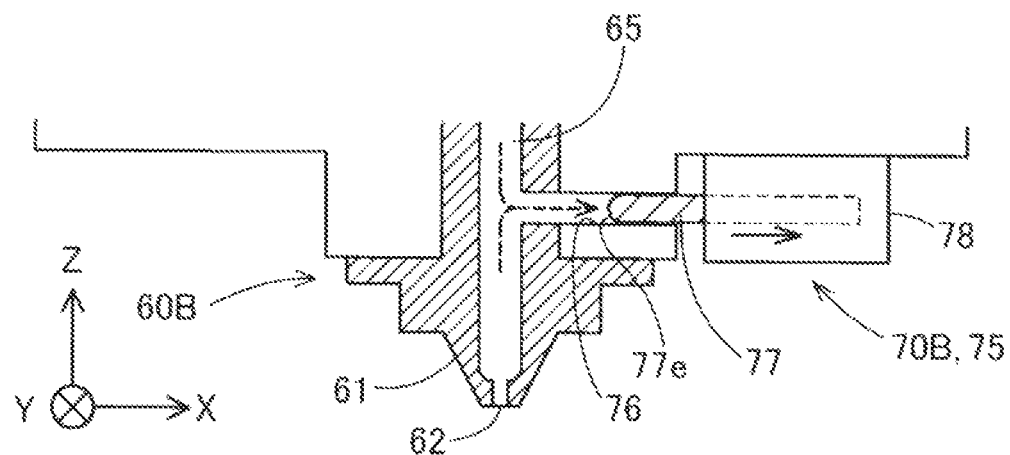
FIG. 7B is a second schematic view which illustrates a configuration of a pressure changing section of a three-dimensional modeling apparatus according to the second embodiment.

With reference to FIGS. 7A and 7B, a configuration of a pressure changing section 75, which is provided as an ejection control mechanism 70B in a three-dimensional modeling apparatus 100B of a second embodiment will be described. The three-dimensional modeling apparatus 100B of the second embodiment has substantially the same configuration as the three-dimensional modeling apparatus 100A of the first embodiment except that the second embodiment has an ejection control mechanism 70B, while the first embodiment has the ejection control mechanism 70A. In the three-dimensional modeling apparatus 100B of the second embodiment, the control unit 300 performs similar modeling process to that described in the first embodiment (FIG. 6).

A head section 60B of an ejection unit 110B of the second embodiment includes an ejection control mechanism 70B of the second embodiment. The ejection control mechanism 70B of the second embodiment includes the pressure changing section 75 that changes pressure in the flow path 65. The pressure changing section 75 includes a branched flow path 76, a rod 77, a rod driving unit 78. The branched flow path 76 is a flow path that allows part of a molten material in the flow path 65 to flow therein. The branched flow path 76 is formed of a through hole that extends in a straight shape and intersects with the flow path 65. The rod 77 is a shaft-like member disposed in the branched flow path 76. The rod driving unit 78 generates a driving force that instantaneously reciprocates the rod 77 in the branched flow path 76 under control of the control unit 300. The rod driving unit 78 is made up of, for example, a solenoid mechanism, a piezo element, and an actuator such as a motor.

In the ejection step of step S10 (FIG. 6), the pressure changing section 75 of the ejection control mechanism 70B positions the rod 77 at an initial position in which an end 77e of the rod 77 is located at a connecting section between the flow path 65 and the branched flow path while a molten material is ejected from the nozzle 61 (FIG. 7A). Then, in temporary discontinuation of ejection of a molten material from the nozzle 61 in step S30 (FIG. 6), the rod driving unit 78 causes the rod 77 to be instantaneously withdrawn into the branched flow path 76 from the initial position (FIG. 7B) so that the end 77e of the rod 77 is located at a deep position in the branched flow path 76. Accordingly, the pressure changing section 75 can suction part of a molten material in the flow path 65 into the branched flow path 76, generate a negative pressure in the flow path 65, and temporarily stop an outflow of a molten material from the nozzle 61.

In resuming ejection of a molten material from the nozzle 61 (step S40 in FIG. 6), the control unit 300 returns the rod 77 to the initial position by the rod driving unit so that a molten material in the branched flow path 76 flows back to the flow path 65 to thereby increase pressure in the flow path 65. Accordingly, an outflow of a molten material from the nozzle 61 is immediately resumed.

As described above, according to the three-dimensional modeling apparatus 100B of the second embodiment, ejection of a molten material from the nozzle 61 can be immediately stopped since the pressure changing section 75 generates pressure in the flow path 65. Further, in resuming an outflow of a molten material from the nozzle 61, the precision in start timing of ejection of a molten material and the precision in ejection amount at the start of ejection of a molten material can be increased since the pressure changing section 75 increases pressure in the flow path 65. In addition, according to the three-dimensional modeling apparatus 100B of the second embodiment, various effects similar to those described in the first embodiment can be achieved.

3. Third Embodiment

Figure 8:
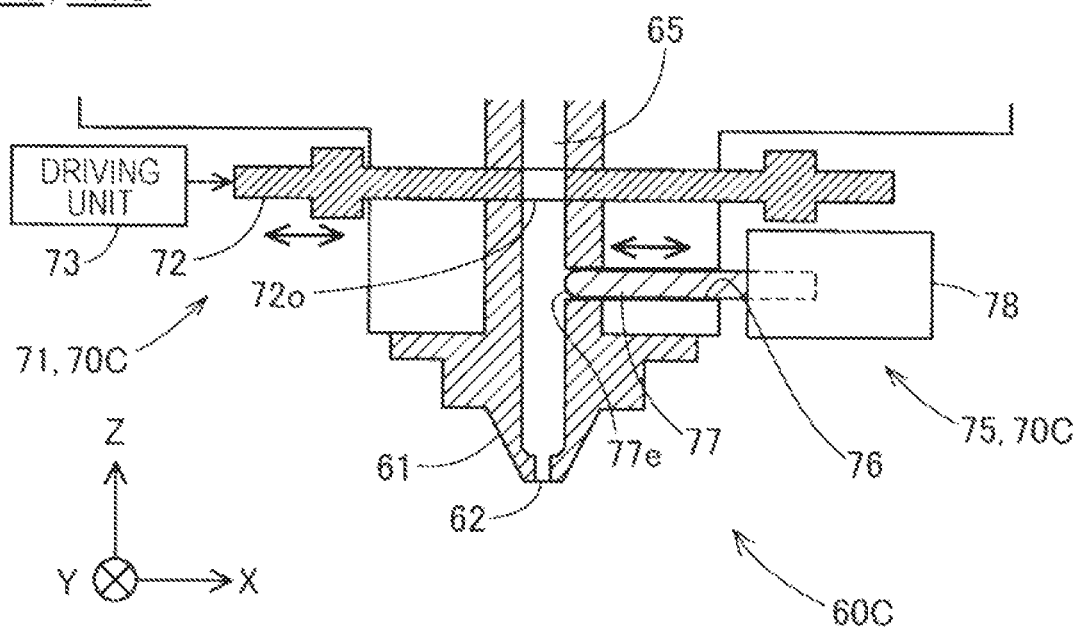
FIG. 8 is a schematic view which illustrates a configuration of an ejection control mechanism of a three-dimensional modeling apparatus according to a third embodiment.

FIG. 8 is a schematic view which illustrates a configuration of a head section 60C included in an ejection unit 110C of a three-dimensional modeling apparatus 100C according to a third embodiment. The three-dimensional modeling apparatus 100C of the third embodiment has substantially the same configuration as the three-dimensional modeling apparatus 100A of the first embodiment except that the third embodiment has an ejection control mechanism 70C, while the first embodiment has the ejection control mechanism 70A.

The ejection control mechanism 70C of the third embodiment includes an open/close mechanism 71 similar to that described in the first embodiment, and a pressure changing section 75 similar to that described in the second embodiment. In the ejection control mechanism 70C, the open/close mechanism 71 is disposed upstream relative to the pressure changing section 75. That is, in the ejection control mechanism 70C, a shutter 72 of the open/close mechanism 71 is disposed at a position close to the flat screw 40 than to the branched flow path 76 of the pressure changing section 75. An open/close operation of the flow path 65 by the open/close mechanism 71 is the same as that described in the first embodiment (FIGS. 5A and 5B). Further, an operation of changing pressure in the flow path 65 by the pressure changing section 75 is the same as that described in the second embodiment (FIGS. 7A and 7B).

Figure 9:
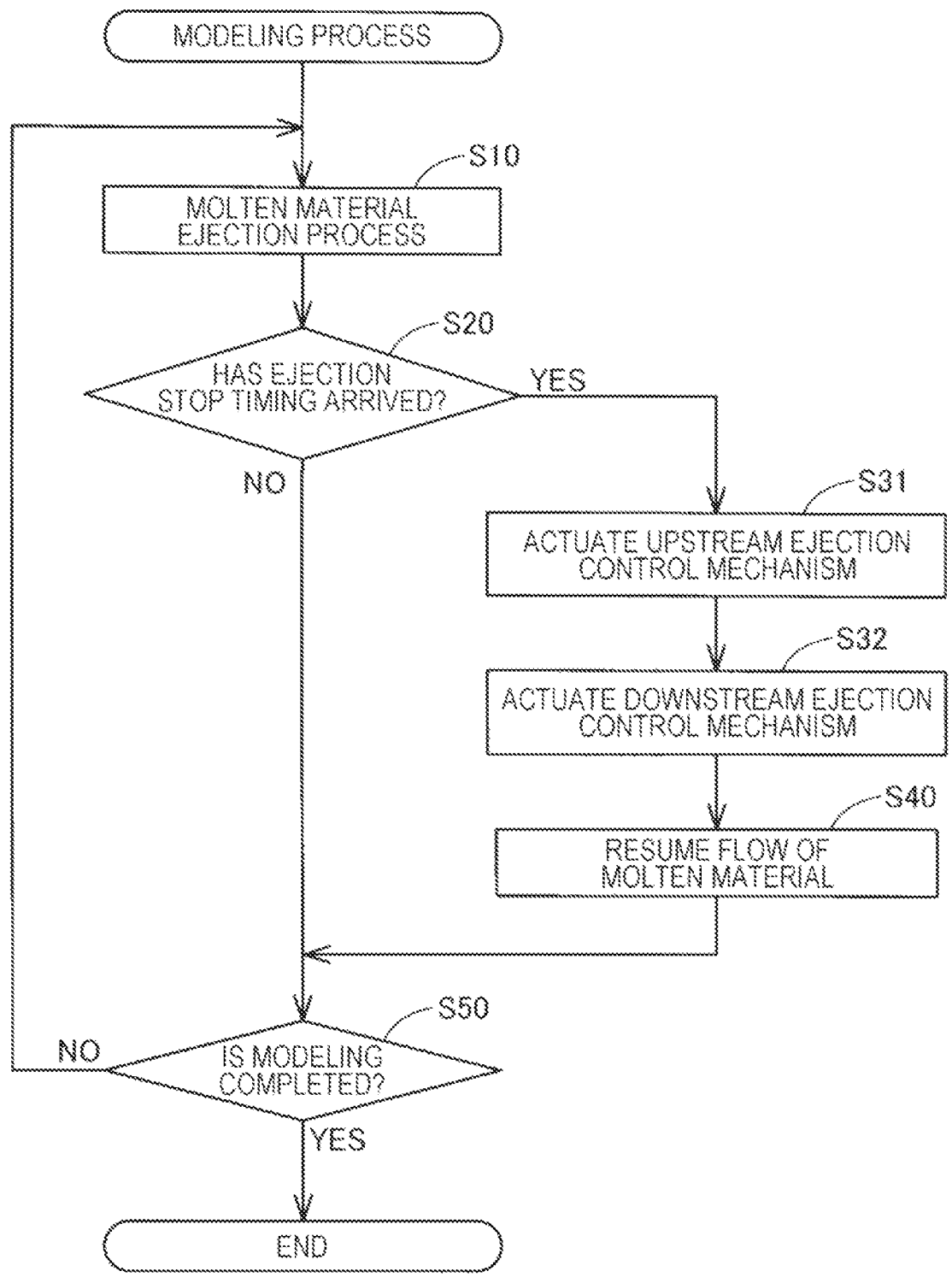
FIG. 9 is an explanatory view which illustrated an example of a flow of a modeling process according to the third embodiment.

FIG. 9 is an explanatory view which illustrates an example of a flow of a modeling process performed by the control unit 300 of the three-dimensional modeling apparatus 100C in the third embodiment. The flow of the modeling process in the third embodiment is substantially the same as the flow (FIG. 6) of the modeling process described in the first embodiment except that outflow control steps of steps S31, S32, and S40 are provided instead of the outflow control step of step S30.

In the three-dimensional modeling apparatus 100C, the outflow control steps of steps S31 to S40 are performed when a timing to temporarily stop ejection of a molten material has arrived in the middle of performing the ejection process of step S10. The outflow control steps include ejection stop steps that perform the processing of steps S31 and S32 for stopping ejection of a molten material from the nozzle 61. The control unit 300 drives one of the open/close mechanism 71 and the pressure changing section 75 of the ejection control mechanism 70C, which is located upstream in the flow path 65, in step S31, and drives the other, which is located downstream, in step S32.

In the ejection stop step of the third embodiment, the control unit 300 closes the flow path 65 in step S31 by the shutter 72 located on the upstream side, and then generates a negative pressure in the flow path 65 in step S32 by the pressure changing section 75 located on the downstream side. According to this ejection stop step, a molten material pushed out from the flow path 65 to the nozzle 61 when the shutter 72 closes the flow path 65 can be suctioned into the branched flow path 76 of the pressure changing section 75. Accordingly, the residual pressure on the downstream side of the shutter 72 can be reduced, thereby preventing a molten material left on the downstream side of the shutter 72 from flowing out from the nozzle 61 while ejection of a molten material from the nozzle 61 is stopped.

In step S40, ejection of a molten material from the nozzle 61 is resumed. In step S40, either of the open/close mechanism 71 and the pressure changing section 75 can be driven first, or alternatively, both can be driven simultaneously. Further, in step S40, when the flow path 65 is opened by the shutter 72, pressure in the flow path 65 is desirably increased by a molten material in the branched flow path 76 being pushed out by the pressure changing section 75 into the flow path 65 by using the rod 77. Accordingly, ejection of a molten material from the nozzle 61 is immediately resumed.

As described above, according to the three-dimensional modeling apparatus 100C of the third embodiment, precision in ejection control of a molten material from the nozzle 61 can be increased since the shutter 72 and the pressure changing section 75 of the open/close mechanism 71 are disposed in the flow path 65. In particular, in the third embodiment, since the pressure changing section 75 is provided downstream relative to the open/close mechanism 71, pressure adjacent to the ejection port 62 of the nozzle 61 can be immediately changed by the pressure changing section 75. Accordingly, ejection of a molten material from the nozzle 61 can be more precisely controlled compared with the configuration in which the pressure changing section 75 is disposed upstream relative to the open/close mechanism 71. In addition, according to the three-dimensional modeling apparatus 100C of the third embodiment, various effects described in the above embodiments can be achieved.

4. Fourth Embodiment

Figure 10:
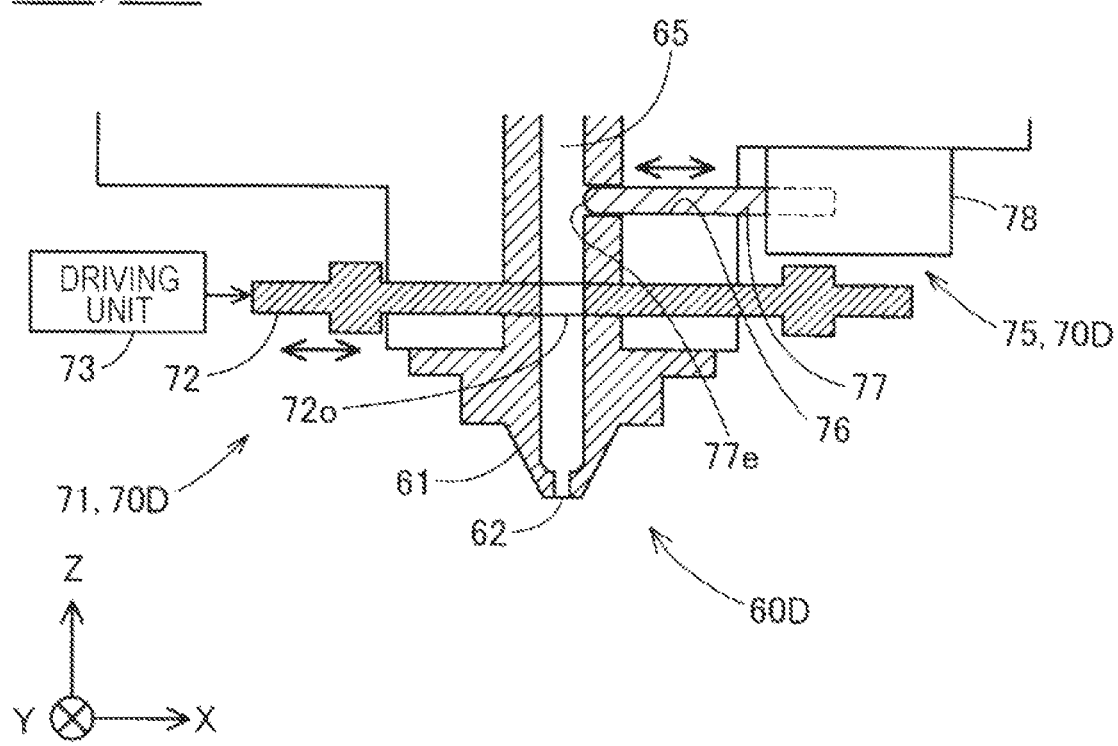
FIG. 10 is a schematic view which illustrates a configuration of an ejection control mechanism of a three-dimensional modeling apparatus according to a fourth embodiment.

FIG. 10 is a schematic view which illustrates a configuration of a head section 60D included in an ejection unit 110D of a three-dimensional modeling apparatus 100D according to a fourth embodiment. The three-dimensional modeling apparatus 100D of the fourth embodiment has substantially the same configuration as the three-dimensional modeling apparatus 100C of the third embodiment except that the fourth embodiment has an ejection control mechanism 70D, while the third embodiment has the ejection control mechanism 70C. The ejection control mechanism 70D of the fourth embodiment has substantially the same configuration as the ejection control mechanism 70C of the third embodiment except that the branched flow path 76 of the pressure changing section 75 is disposed upstream relative to the shutter 72 of the open/close mechanism 71.

In the three-dimensional modeling apparatus 100D of the fourth embodiment, the control unit 300 performs modeling process by a similar flow to that described in the third embodiment (FIG. 9). When temporarily stopping ejection of a molten material of step S10, the control unit 300 first drives the pressure changing section 75 located on the upstream side in the flow path 65 to generate negative pressure in the flow path 65 (step S31). Then, the control unit 300 drives the open/close mechanism 71 to thereby close the flow path 65 by the shutter 72 (step S32).

As described above, according to the three-dimensional modeling apparatus 100D of the fourth embodiment, in temporary discontinuation of ejection of a molten material from the nozzle 61 in the ejection stop step, the flow path 65 is closed by the shutter 72 after pressure in the flow path 65 is reduced. Accordingly, the shutter 72 can smoothly move for closing the flow path 65. Further, the movement of the shutter 72 can prevent a molten material from being pushed out from the nozzle 61 and leaking from the nozzle 61. Moreover, an increase in pressure in the flow path 65 between the flat screw 40 and the shutter 72 when the flow path 65 is closed by the shutter 72 is reduced. In addition, according to the three-dimensional modeling apparatus 100D of the fourth embodiment, various effects described in the above embodiments can be achieved.

5. Other Embodiments

Various configurations described in the above embodiments can be modified as the following example embodiments. All the embodiments described below are construed as examples of the embodiment of the invention as with the aforementioned embodiments.

5-1. Other Embodiment 1

In the above embodiments, the gap G between the tip of the nozzle 61 and the three-dimensional object OB may be smaller than the hole diameter Dn of the ejection port 62 of the nozzle 61. Alternatively, the gap G may be more than 1.5 times of the hole diameter Dn of the ejection port 62 of the nozzle 61.

5-2. Other Embodiment 2

In the open/close mechanism 71 in the above embodiments, the through hole 72o of the shutter 72 may be omitted. The shutter 72 may close and open the flow path 65 by its end portion traversing the flow path 65. The shutter of the open/close mechanism 71 may be formed of a plurality of plate members, which are overlapped with each other. This shutter may be configured to close and open the flow path 65 by the plate members moving in different directions to thereby change an opening area of the flow path 65. The open/close mechanism 71 may be formed of a butterfly valve. In this case, the shutter of the open/close mechanism 71 is formed of a disc plate which is positioned to rotate in the flow path 65 in a direction about the center axis.

5-3. Other Embodiment 3

In the above embodiments, the pressure changing section 75 generates negative pressure in the flow path 65 by the rod 77 moving in the branched flow path 76. Alternatively, the pressure changing section 75 may generate negative pressure in the flow path 65 by other configurations. The pressure changing section 75 may also generate negative pressure in the flow path 65, for example, by suctioning a molten material into the branched flow path 76 by means of a suction force of a pump. Further, in this configuration, the molten material suctioned in the branched flow path 76 may be circulated into the flat screw 40 for reuse, or may be discharged outside the apparatus.

5-4. Other Embodiment 4

In the above embodiments, the pressure changing section 75 may not be configured to increase pressure in the flow path 65 when the molten material starts to flow out from the ejection port 62 of the nozzle 61. The pressure changing section 75 may gradually move the rod 77 to the initial position to a degree that pressure in the flow path does not substantially change after a molten material flows out from the nozzle 61.

5-5. Other Embodiment 5

Flows of the modeling process described in the above embodiments are merely examples. In the three-dimensional modeling apparatuses 100A to 100D of the above embodiments, a control method of another flow of the modeling process may be used. For example, in the first embodiment, the flow path 65 may be closed by the shutter 72 before step S10 while the flat screw 40 has been rotated, and may be opened by the shutter 72 on starting the ejection process of step S10. Further, in the second embodiment, negative pressure may be generated in the flow path 65 by the pressure changing section 75 to thereby prevent undue leakage of a molten material from the nozzle 61 when rotation of the flat screw 40 is stopped to terminate the modeling process. In the ejection stop step in the third and fourth embodiments, the open/close mechanism 71 and the pressure changing section 75 may be driven simultaneously. Alternatively, one of the open/close mechanism 71 and the pressure changing section 75, which is located on the downstream side, may be driven before the other, which is located on the upstream side.

5-6. Other Embodiment 6

In the above embodiments, the material supply section 20 may not be formed of a hopper. In the ejection units 110A to 110D, the material supply section 20 may not be provided. Further, the material supply section 20 may not be configured to supply a solid material to the flat screw 40. The material supply section 20 may be configured to supply a molten material that is already plasticized or a half-molten material that is partially plasticized to the flat screw 40.

5-7. Other Embodiment 7

In the above embodiments, the three-dimensional modeling apparatuses 100A to 100D may include a movement mechanism that moves the nozzle 61 of the ejection units 110A to 110D in a three-dimensional manner instead of the movement mechanism 230 that moves the modeling stage 220 in a three-dimensional manner. Alternatively, another transport mechanism can be used in which one of the nozzle 61 and the modeling stage 220 is moved in one axis direction or two axis directions, and the other is moved in the remaining axis direction.

5-8. Other Embodiment 8

In the above embodiments, part or all of the functions or processing implemented by software may also be implemented by hardware including circuits. Further, part or all of the functions or processing implemented by hardware may also be implemented by software. The hardware may use various circuits such as integrated circuits, discrete circuits, and circuit modules made of a combination thereof.

The present invention is not limited to the above embodiments (including other embodiments) and examples, and can be embodied as various configurations without departing from the scope of the present invention. For example, the technical features in the embodiment and examples corresponding to the technical features in the examples described in the summary of the invention may be replaced or combined as appropriate in order to solve part or all the above problems or achieve part or all the above effects. Further, not only the technical features described as being not essential in the description, but also the technical features may be eliminated as appropriate unless they are described as being essential in the description.

What is claimed is:

1. A three-dimensional modeling apparatus that produces a three-dimensional object, the three-dimensional modeling apparatus comprising:
 a nozzle having an ejection port that ejects a molten material; and
 a plasticization section which includes a flat screw having a groove extending in a first volute shape, a driving motor that rotates the flat screw, and a screw facing section, the plasticization section rotating the flat screw to thereby guide the molten material, which is a plasticized thermoplastic material, to the nozzle through the groove, a depth of a first groove, which is a part of the groove, being greater than a depth of a second groove, which is a part of the groove and is located closer to a center of the flat screw than the first groove.

2. The three-dimensional modeling apparatus according claim 1, further comprising:
an ejection control mechanism that is disposed in a flow path between the flat screw and the ejection port of the nozzle, and controls an outflow of the molten material from the nozzle,
wherein the ejection control mechanism includes a butterfly valve which is positioned to rotate in the flow path in a direction about a center axis.

3. The three-dimensional modeling apparatus according claim 2, wherein the ejection control mechanism includes a pressure changing section that suctions the molten material into a branched flow path connected to the flow path to thereby generate a negative pressure in the flow path.

4. The three-dimensional modeling apparatus according to claim 3, wherein the butterfly valve of the ejection control mechanism is disposed upstream relative to the branched flow path of the pressure changing section.

5. The three-dimensional modeling apparatus according to claim 3, wherein the branched flow path of the pressure changing section is disposed upstream relative to the butterfly valve of the ejection control mechanism.

6. The three-dimensional modeling apparatus according to claim 3, wherein the pressure changing section allows the molten material which has been suctioned into the branched flow path to be returned to the flow path to thereby increase pressure in the flow path.

7. The three-dimensional modeling apparatus according claim 1, further comprising:
an ejection control mechanism that is disposed in a flow path between the flat screw and the ejection port of the nozzle, and controls an outflow of the molten material from the nozzle,
wherein the ejection control mechanism includes an open/close mechanism that opens and closes the flow path by means of a shutter.

8. The three-dimensional modeling apparatus according to claim 1, wherein the screw facing section includes a screw facing surface having a plurality of guide grooves directly connected to a communication hole that communicates with the nozzle, the plurality of guide grooves having a second volute shape and extending from the communication hole toward an outer periphery of the screw facing surface.

9. The three-dimensional modeling apparatus according to claim 1, wherein the flat screw has a plurality of the grooves, and the side surface of the flat screw has a plurality of a material inlets respectively corresponding to each groove.

10. A method for controlling a three-dimensional modeling apparatus that produces a three-dimensional object, the method comprising:
an ejection step for rotating a flat screw having a groove extending in a first volute shape by means of a driving motor to thereby guide a molten material to a communication hole of a screw facing section that includes a screw facing surface and then guiding the molten material through the communication hole to an ejection port of a nozzle to allow the molten material to be ejected from the ejection port;
wherein a depth of a first groove, which is part of the groove, is greater than a depth of a second groove, which is a part of the groove and is located closer to a center of the flat screw than the first groove.

11. The method according to claim 10, further comprising;
an outflow control step for driving an ejection control mechanism that is disposed in a flow path for the molten material between the flat screw and the ejection port to thereby control an outflow of the molten material from the ejection port,
wherein the ejection control mechanism includes a butterfly valve which is positioned to rotate in the flow path in a direction about a center axis and a pressure changing section that suctions the molten material into a branched flow path connected to the flow path to thereby generate a negative pressure in the flow path, and
the outflow control step includes an ejection stop step for stopping an outflow of the molten material from the ejection port by driving the butterfly valve and the pressure changing section of the ejection control mechanism, which is located on an upstream relative to the butterfly valve.

* * * * *